I. W. MASON.
SPIRIT LEVEL.
APPLICATION FILED NOV. 6, 1914.
1,154,873.
Patented Sept. 28, 1915.
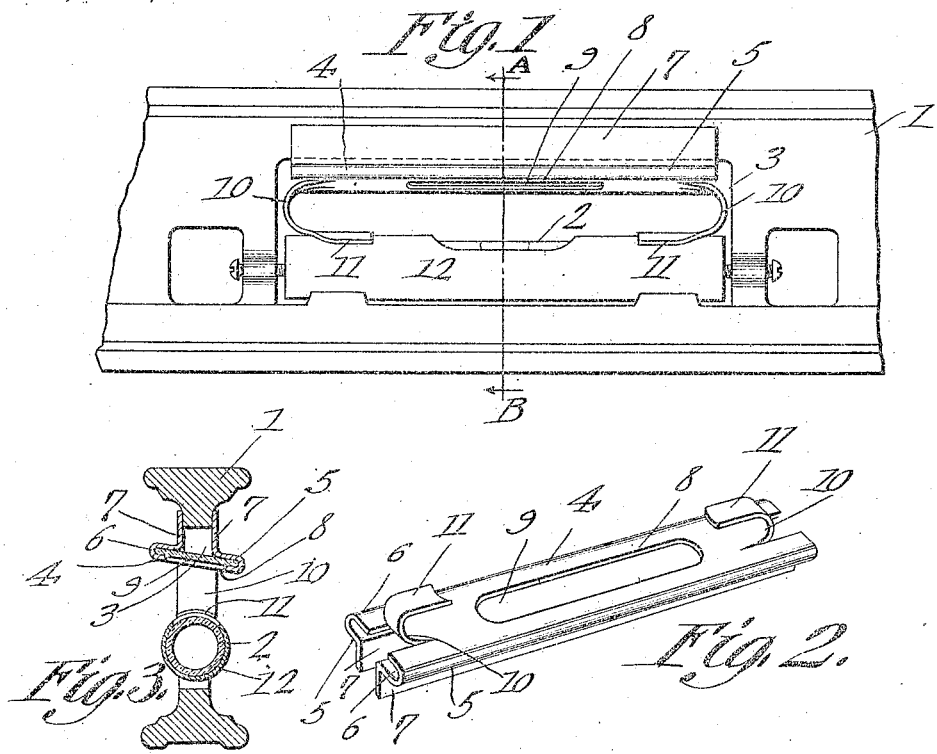
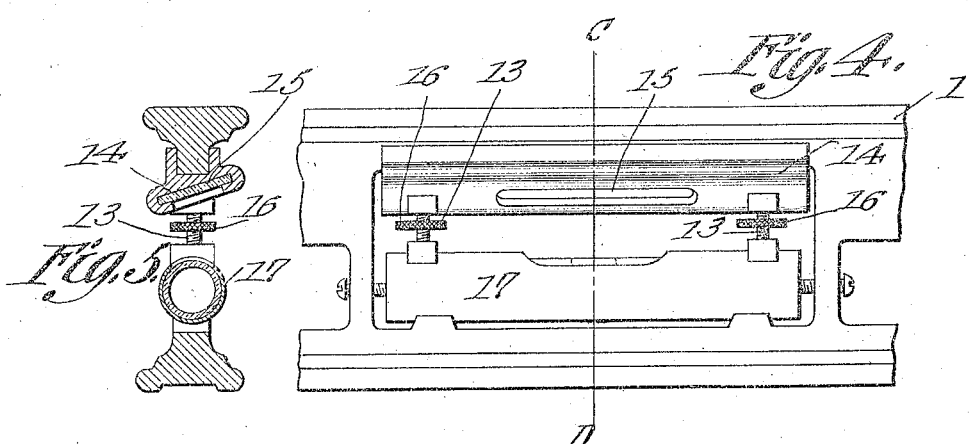
Witnesses
I. W. Mason
Inventor
by
Attorneys they may appear in levels of various types, and the construction may be changed as found desirable.

UNITED STATES PATENT OFFICE.

IRVING W. MASON, OF ABERDEEN, WASHINGTON.

SPIRIT-LEVEL.

1,154,873.   Specification of Letters Patent.   Patented Sept. 28, 1915.

Application filed November 6, 1914. Serial No. 870,628.

*To all whom it may concern:*

Be it known that I, IRVING W. MASON, a citizen of the United States, residing at Aberdeen, in the county of Chehalis and State of Washington, have invented a new and useful Spirit-Level, of which the following is a specification.

This invention relates to spirit levels and more especially to means whereby the position of the bubble within the vial in the level can be readily determined when the level is supported at a point above the user and where, under ordinary circumstances, it would be necessary to climb upon a ladder or other support in order to look down upon the vial.

A further object is to provide means for use in connection with a level of standard make whereby the position of the bubble can be determined by looking upwardly at the level.

A further object is to provide an attachment which is simple in construction, can be readily applied, and which will accurately and clearly disclose the position of the bubble.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings, Figure 1 is a side elevation of a portion of a spirit level having the present improvements combined therewith. Fig. 2 is a perspective view of the attachment. Fig. 3 is a transverse section through the spirit level, said section being taken on the line A—B Fig. 1. Fig. 4 is a side elevation of a portion of a spirit level having a modified form of attachment. Fig. 5 is a section on line C—D Fig. 4.

Referring to the figures by characters of reference 1 designates a spirit level of the "Stanley" type wherein the vial 2 is supported within an opening 3 formed within the body of the spirit level. The attachment constituting the present invention is adapted to be placed within this opening and directly opposite the vial and includes a holder made up of a flat strip 4 having its sides turned inwardly as at 5, thus to form opposed guide channels 6. Longitudinal flanges 7 extend from the inturned sides 5 and are spaced apart a sufficient distance to receive between them the body of the level, as shown particularly in Fig. 3. These flanges 7 are so disposed that, when they are in proper position in engagement with the body of the spirit level, they support the plate or strip 4 in an inclined position. This strip 4 has an elongated opening 8 and supported by the strip 4 and with its edge portions seated in the channels 6, is a mirror 9. The opening 8 is located directly opposite the exposed portion of the vial 2 so that, when the bubble becomes visible, the reflection thereof will appear within the mirror. Spring arms 10 are formed integral with the end portions of the strip 4 and are provided with feet 11 which are bowed transversely so as to fit snugly upon the end portions of the vial holder 12 mounted in the opening 3. The spring arms 10 thrust the attachment upwardly or outwardly against the wall of the body 1 of the spirit level so that after the attachment has once been placed within the opening 3, it will not become accidentally displaced.

It will be apparent that when a spirit level is provided with an attachment such as described, the same can be placed upon a structure located above the level of the eye of the user and by glancing upwardly into the exposed portion of the mirror 9, the user can determine readily the position of the bubble relative to the center of the vial.

Instead of mounting the attachment upon yielding supports such as the arms 10, said attachment can be mounted at its ends upon threaded posts 13 as shown in Figs. 4 and 5 and in this construction the shoulder 14 provided for the mirror 15 is preferably formed in a single casting instead of sheet metal. Each of the posts 13 has a head 16 whereby it can be readily screwed into or unscrewed from the vial holder 17, thus to shift the mirror holder away from or toward the vial.

Obviously various other changes can be made in the construction and arrangement of the parts without departing from the spirit of the invention. For example, an attachment such as described can be applied readily to the transverse or plumb vial as well as to a longitudinal vial such as shown. This construction is so obvious that it is not deemed necessary to illustrate the same.

What is claimed is:—

1. The combination with a spirit level, of a holder adapted to straddle a portion of the body of the spirit level, means for binding said holder against a portion of said body, and a mirror supported by the holder directly opposite the vial of the spirit level.

2. An attachment for spirit levels, including a holder, means thereon for straddling a portion of the body of the spirit level, a mirror supported by the holder, there being an opening within the holder through which a portion of the mirror is exposed, and means for detachably securing the holder to the body portion of a spirit level.

In testimony that I claim the foregoing as my own, I have hereunto affixed my signature in the presence of two witnesses.

IRVING W. MASON.

Witnesses:
T. H. McKay,
J. B. Elstry.